(12) United States Patent
Jones et al.

(10) Patent No.: US 7,687,439 B2
(45) Date of Patent: Mar. 30, 2010

(54) METHOD OF REMOVING AN INVERT EMULSION FILTER CAKE AFTER THE DRILLING PROCESS USING A SINGLE PHASE MICROEMULSION

(75) Inventors: Thomas A. Jones, Cypress, TX (US); David E. Clark, Humble, TX (US); Lirio Quintero, Houston, TX (US); Bruce Rae Ewen, Alford (GB)

(73) Assignee: Baker Hughes Incorporated, Houston, TX (US)

( * ) Notice: Subject to any disclaimer, the term of this patent is extended or adjusted under 35 U.S.C. 154(b) by 709 days.

(21) Appl. No.: 11/541,860

(22) Filed: Oct. 2, 2006

(65) Prior Publication Data

US 2007/0027253 A1 Feb. 1, 2007

Related U.S. Application Data

(62) Division of application No. 11/218,822, filed on Sep. 2, 2005, now Pat. No. 7,134,496.

(60) Provisional application No. 60/606,959, filed on Sep. 3, 2004.

(51) Int. Cl.
*C09K 8/28* (2006.01)
*B01F 3/08* (2006.01)
*B01F 17/00* (2006.01)

(52) U.S. Cl. .............. 507/131; 507/136; 507/138; 507/241; 507/260; 507/267; 516/21; 516/27; 516/203; 516/204

(58) Field of Classification Search ........... 507/131, 507/136, 138, 241, 260, 267; 516/21, 27, 516/203, 204
See application file for complete search history.

(56) References Cited

U.S. PATENT DOCUMENTS

| | | | |
|---|---|---|---|
| 3,804,760 | A | 4/1974 | Darty |
| 4,036,300 | A | 7/1977 | Holm et al. |
| 4,882,075 | A | 11/1989 | Jones |
| 5,189,012 | A | 2/1993 | Patel et al. |
| 5,286,386 | A | 2/1994 | Darian et al. |
| 5,707,939 | A | 1/1998 | Patel |
| 5,811,383 | A | 9/1998 | Klier et al. |
| 5,869,433 | A | 2/1999 | Patel |
| 6,255,269 | B1 * | 7/2001 | Leonard et al. ............ 510/238 |
| 6,593,279 | B2 | 7/2003 | Von Krosigk et al. |
| 6,793,025 | B2 | 9/2004 | Patel et al. |
| 5,830,831 | A1 | 11/2008 | Chan et al. |
| 2003/0166472 | A1 | 9/2003 | Pursley et al. |
| 2004/0140094 | A1 | 7/2004 | Todd et al. |
| 2004/0147404 | A1 | 7/2004 | Thaemlitz et al. |
| 2004/0259738 | A1 | 12/2004 | Patel |
| 2006/0096757 | A1 | 5/2006 | Berry et al. |

FOREIGN PATENT DOCUMENTS

| | | |
|---|---|---|
| GB | 2347682 A | 9/2000 |
| WO | WO 99/05392 A1 | 2/1999 |
| WO | WO 99/41342 A1 | 8/1999 |
| WO | WO0100747 A | 1/2001 |
| WO | 2006/109016 A1 | 10/2006 |

OTHER PUBLICATIONS

K. Holmberg, "Quarter Century Progress and New Horizons in Microemulsions," Micelles, Microemulsions and Monolayers, D. Shah, ed. 1998, pp. 161-192, Marcel Dekker, New York.
T. Huang, et al., "Carbonate Matrix Acidizing Fluids at High Temperatures: Acetic Acid, Chelating Agents or Long-Chained Carboxylic Acids?", SPE European Formation Damage Conference, May 13-14, 2003, SPE 82268.
H. A. Nasr-El-Din, et al., "Evaluation of a New Barite Dissolver: Lab Studies", SPE International Symposium and Exhibition on Formation Damage Control, Feb. 18-20, 2004, SPE 86501.
I. Lakatos, et al., "Potential of Different Polyamino Carboxylic Acids as Barium and Strontium Sulfate Dissolvers", SPE European Formation Damage Conference, May 25-27, 2005, SPE 94633.
J. Harrison; "Microemulsion Technology for Surfactants," Specialty Chemicals Magazine, Nov. 2004, pp. 32, 34, 36.

* cited by examiner

*Primary Examiner*—Timothy J. Kugel
(74) *Attorney, Agent, or Firm*—Mossman Kumar & Tyler PC

(57) ABSTRACT

Single phase microemulsions improve the removal of filter cakes formed during drilling with invert emulsions. The single phase microemulsion removes oil and solids from the deposited filter cake. Optionally, an acid capable of solubilizing the filter cake bridging particles may also be used with the microemulsion. In one non-limiting embodiment the acid may be a polyamino carboxylic acid. Skin damage removal from internal and external filter cake deposition can be reduced.

13 Claims, 2 Drawing Sheets

METHOD OF REMOVING AN INVERT EMULSION FILTER CAKE AFTER THE DRILLING PROCESS USING A SINGLE PHASE MICROEMULSION

CROSS-REFERENCE TO RELATED APPLICATION

This application is a divisional application from U.S. patent application Ser. No. 11/218,822 filed Sep. 2, 2005, issued Nov. 14, 2006 as U.S. Pat. No. 7,134,496, which in turn claims the benefit of U.S. Provisional Application No. 60/606,959 filed Sep. 3, 2004.

FIELD OF THE INVENTION

The present invention relates to methods and compositions for reducing or removing wellbore skin damage, invert emulsion drilling fluid and filter cake deposition during and after oil well drilling, and more particularly relates, in one embodiment, to methods and compositions for reducing or removing invert emulsions and bridging particles using single phase microemulsions.

BACKGROUND OF THE INVENTION

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The drilling fluid should carry cuttings from beneath the bit, transport them through the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the claimed invention herein, the term "drilling fluid" also encompasses "drill-in fluids" and "completion fluids".

Drilling fluids are typically classified according to their base fluid. In water-based muds, solid particles are suspended in water or brine. Oil can be emulsified in the water. Nonetheless, the water is the continuous phase. Oil-based muds are the opposite or inverse. Solid particles are suspended in oil, and water or brine is emulsified in the oil and therefore the oil is the continuous phase. Oil-based muds which are water-in-oil macroemulsions are also called invert emulsions. The oil in oil-based (invert emulsion) mud can consist of any oil that may include diesel, mineral oil, esters, or alpha olefins. Brine-based drilling fluids, of course are a water-based mud in which the aqueous component is brine.

It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

Filter cakes are the residue deposited on a permeable medium such as a formation surface when a slurry or suspension, such as a drilling fluid, is forced against the medium under pressure. Filtrate is the liquid that passes through the medium, leaving the cake on the medium. Cake properties such as cake thickness, toughness, slickness and permeability are important because the cake that forms on permeable zones in a wellbore can cause stuck pipe and other drilling problems. Reduced hydrocarbon production can result from reservoir or skin damage when a poor filter cake allows deep filtrate invasion. In some cases, a certain degree of cake buildup is desirable to isolate formations from drilling fluids. In open hole completions in high-angle or horizontal holes, the formation of an external filter cake is preferable to a cake that forms partly inside the formation (internal). The latter has a higher potential for formation damage. It will be appreciated that in the context of this invention the term "filter cake" includes any emulsion or invert emulsion part of the filter cake, and that the filter cake is defined as a combination of any added solids, if any, and drilled solids. It will also be understood that the drilling fluid, e.g. invert emulsion fluid, is concentrated at the bore hole face and partially inside the formation.

Many operators are interested in improving formation clean up after drilling into reservoirs with invert emulsion drilling fluids. More efficient filter cake and formation clean up is desired for a number of open hole completions, including stand-alone and expandable sand screens as well as for gravel pack applications for both production and water injection wells. Skin damage removal from internal and external filter cake deposition during oil well reservoir drilling with invert emulsion drill-in and drilling fluids is desirable to maximize hydrocarbon recovery, particularly in open hole completions.

It would be desirable if compositions and methods could be devised to aid and improve the ability to clean up filter cake, and to remove it more completely, without causing additional formation damage.

SUMMARY OF THE INVENTION

Accordingly, it is an object of the present invention to provide a method and composition for substantially removing water-in oil emulsion and filter cake particles from a hydrocarbon reservoir wellbore.

It is another object of the present invention to provide a composition and simplified, "one-step" method for removing water-in-oil emulsion and filter cake particles from a hydrocarbon reservoir wellbore.

In carrying out these and other objects of the invention, there is provided, in one non-limiting form, a method of removing a majority of water-in-oil invert emulsion and filter cake particles from a hydrocarbon reservoir wellbore that involves drilling a wellbore in a hydrocarbon reservoir with an invert emulsion drilling fluid (defined herein to include a drill-in fluid as well). A filter cake of water-in-oil emulsion and bridging particles is formed over at least part of the wellbore. The invert emulsion is changed to either a water continuous (oil-in-water) or oil continuous (water-in-oil) microemulsion by adding a single phase microemulsion composition, which results in a majority of the external oil in the filter cake being incorporated into the single phase microemulsion and the filter cake altered. This may be accomplished without circulating the well. The altered filter cake can then be removed with production, injection, acid treatment, or displacement.

An acid may be optionally used to solubilize the bridging particles in the filter cake. The acid may be a mineral acid and/or an organic acid, and in one non-limiting embodiment may be a polyamino carboxylic acid (PACA).

Further, there is provided in another non-restrictive embodiment of the invention a method for open hole completions that involves drilling to total depth with invert emulsion drilling fluids, which fluids comprise acid-soluble weighting and/or bridging agents and the forming a filter cake. At total depth a short trip is made into the casing and involves running back in the open hole (RIH) to the bottom and chemically conditioning the drilling fluid to optimize displacement, as necessary. A base oil spacer is pumped to scour the external filter cake in the wellbore. A viscosified, weighted push pill is pumped, where the push pill includes at least the invert emulsion drilling fluid. Next, a solids-free invert emulsion drilling fluid is pumped into the open hole and at least partially into the casing above the casing shoe. Once the leading edge of solids-free invert emulsion fluid is positioned above the casing shoe, the bottom of the work string is pulled up into the casing shoe. At this time the original drilling fluid is circulated across appropriately sized shaker screens so that the larger solids in the drilling fluid are removed and the particles remaining will not plug completion screens. Subsequently, the work string is pulled out of the hole to surface and the completion screen is run to the bottom of the open hole. The completion screen, a sand control device, may be of any type but typically is either an expandable, stand-alone or gravel pack screen. With the sand control screen safely on bottom, the solids-free invert emulsion drilling fluid is displaced out of the open hole and partially into the casing and above packer assembly with the single phase microemulsion. Next the work assembly or expandable tools are tripped out of the hole and preparations are made to run in the hole and set the packer. Once the packer is set and the open hole is isolated from the casing interval, the single phase microemulsion is allowed to penetrate filter cake and decompose the filter cake components without circulating the well. Finally, when surface preparations are complete and the wellbore has been reentered, water is injected to charge the reservoir to produce hydrocarbons. Acid is an optional component of the single phase microemulsion.

Additionally, there is provided in another non-limiting embodiment of the invention, a method for removing a majority of invert emulsion and filter cake particles from a hydrocarbon reservoir wellbore that includes drilling a wellbore in a hydrocarbon reservoir with an invert emulsion drilling fluid. A filter cake is formed of water-in-oil invert emulsion and bridging particles over at least part of the wellbore. During the gravel packing operation, the gravel pack carrier fluid is treated with the single phase microemulsion. Once the gravel is in place, the carrier fluid containing the single phase microemulsion resides in the inter-granular spaces. The single phase microemulsion is allowed to contact the filter cake for a time after the gravel is in place, without circulating the well. At least a majority of the filter cake is removed. Furthermore, in a separate operation, an optional acid soak may be placed inside the gravel pack sand screens and allowed to penetrate the gravel to the acid soluble bridging material remaining on the reservoir face. After the acid soak, water injection operations can proceed.

There is additionally provided in an alternate embodiment a thermodynamically stable, macroscopically homogeneous, single phase microemulsion that includes a polar phase; a nonpolar phase; a surfactant; and a polyamino carboxylic acid (PACA).

DETAILED DESCRIPTION OF THE INVENTION

Figure 1:
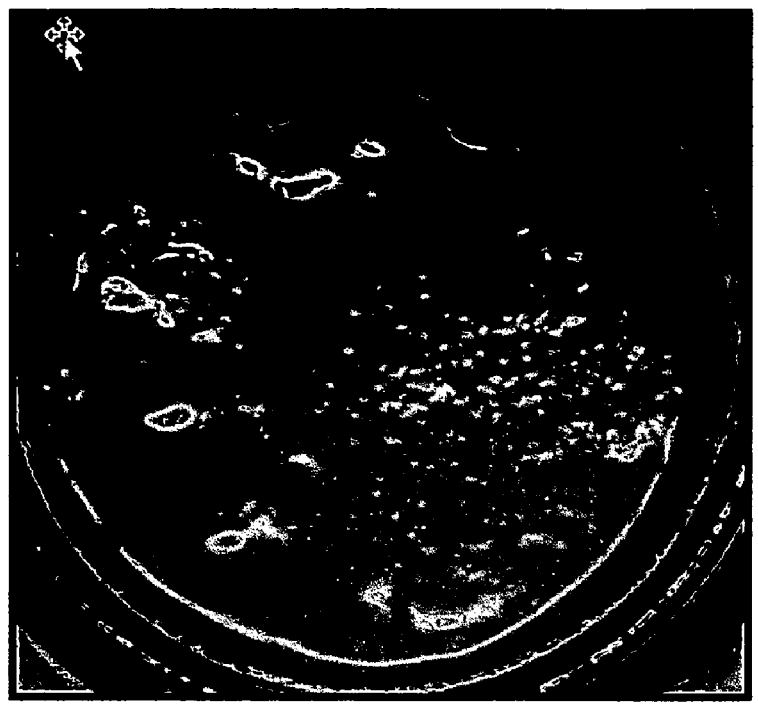
FIG. 1 is a photograph of a typical mud cake or filter cake appearance on a ceramic disc after mud-off at 500 psi (3.4 MPa) and 150° F. (66° C.), before contact with any soak solutions.

It has been discovered that post drill-in treatment and alteration of a majority of filter cake particles can be accomplished by changing the invert water-in-oil emulsion into a single phase microemulsion, such as Winsor IV or similar chemistry, as will be described in more detail. Single phase microemulsions can be defined as O/W and W/O. In one non-limiting explanation of the inventive phenomenon, an o/w single phase microemulsion contacts the oil-based mud and filter cake and forms a water continuous (oil-in-water) microemulsion. It has been surprisingly discovered that this contacting may be accomplished without circulating the well, by which is meant pumping fluid through the whole active fluid system, including the borehole and all the surface tanks that constitute a primary system. The literature generally describes these microemulsions as single phase microemulsions.

The use of this single phase microemulsion chemistry in open hole completion allows the direct contact of a chelating agent, such as an acid and/or an acid blend mixed in conventional brine completion fluids, without causing a high viscosity oil continuous emulsion (sludge) and formation blockage. The action of the single phase microemulsion alters the deposited filter cake which allows a chelating agent such as an acid or a salt of an acid, such as a polyamino carboxylic acid (PACA) and/or a mineral acid or salt thereof, e.g. hydrochloric acid or an organic acid or salt thereof, e.g. acetic acid, or other acid, to solubilize the bridging and formation particles, such as calcium carbonate, hematite, ilmenite, and barite. Bridging particles composed of magnesium tetroxide (in one non-limiting embodiment) may be treated with a single phase microemulsion/acid blend, providing the acid is an organic acid in one non-limiting embodiment of the invention. It has been found that PACAs perform relatively better in an alkaline environment as the salt of these acids, which further differentiates them from the more common acidic acids and salts thereof.

For instance a salt of PACA dissociates barium sulfate from the calcium carbonate treated; the PACA takes on the cation. In a non-limiting example, a Na or K salt of PACA when contacting calcium carbonate contacts and dissolves the barium salt through cationic exchange. The salt form of PACAs performs relatively better than the plain acid form, but the non-salt acid form still performs the functions and achieves the desired result of the invention. The plain acid form works somewhat better at relatively low pH.

The net effect of such a treatment system will improve an operator's chance of injecting water in a reservoir to maintain reservoir pressure (for example, for injection wells), and improve production rates in producing wells. In either case, skin (filter cake) alteration is accomplished by circulating and placing the single phase microemulsion across the injection/production interval. The single phase microemulsion may be used for open hole expandable and non-expandable screen applications or various cased hole operations.

In brief, one non-limiting embodiment invert emulsion filter cake clean up technology of this invention, also referred to herein as "one-step" filter cake clean up, utilizes single phase microemulsion and optional chelating agent techniques in a single blend to change the emulsion of an invert emulsion filter cake to a microemulsion and simultaneously decompose its acid soluble components. Altering the filter cake using single phase microemulsions facilitates solublization of solids by preventing a sludge that could form between the chelating agent and invert emulsion cake and making soluble particles unavailable to unspent chelating agent.

It will be appreciated that it is not necessary for all of the bridging particles to be removed from a filter cake for the inventive method and its compositions to be considered successful. Success is obtained if more particles are removed using the single phase microemulsion than if it is not used, or if more particles are removed using a single phase microemulsion together with a chelating agent, as compared to the case where no microemulsion and/or chelating agent is used. Alternatively, the invention is considered successful if a majority of the filter cake particles are removed. In general, of course, it is desirable to remove as much of the invert emulsion and filter cake as possible. One non-restrictive goal of the invention to remove filter cake particles to obtain 90% injection or production permeability.

Of particular interest is the ability to drill into a reservoir having massive shale sections with an invert emulsion drill-in fluid and gravel packing the same wellbore using brine as the carrier fluid for the gravel pack sand. For this technique to be accepted shale stability must be maintained and there must not be unwanted sludge created between the brine carrier fluid and invert emulsion filter cake during or after the gravel pack.

The wellbore clean up technology described herein has a wide range of applications. By combining the chemical aspect of wellbore (filter cake) clean up with displacement techniques, it is believed that gravel packing disadvantages after drill-in with invert emulsion fluids and gravel packing with brine carrier fluids can be eliminated.

The methods and compositions of this invention have the advantages of reduced formation skin damage to the wellbore, and consequently increased hydrocarbon recovery, and/or increased water injection rate, as compared with an otherwise identical method and composition absent the single phase microemulsions and/or the single phase microemulsion including a chelating agent of this invention. Microemulsions are thermodynamically stable, macroscopically homogeneous mixtures of at least three components: a polar phase and a nonpolar phase (usually, but not limited to, water and organic phase) and a surfactant. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., Handbook of Microemulsion Science and Technology, Marcel Dekker, Inc., New York, 1999, pp. 185-246.

The referenced chapter describes the types of microemulsion phase formulations defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor II when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions of the present invention are of the Winsor IV type, which means the entire system is a microemulsion phase. The thermodynamically stable single phase Winsor IV microemulsion is further discussed in GB 2,347,682 A and U.S. patent application Ser. No. 20040127749.

Surfactants suitable for creating the single phase microemulsions of this invention include, but are not necessarily limited to nonionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, methyl glucoside esters, or alcohol ethoxylates. Suitable cationic surfactants include, but are not necessarily limited to, arginine methyl esters, alkanolamines and alkylenediamides.

In one non-limiting embodiment of the invention the suitable anionic surfactants include alkali metal alkyl sulfates, alkyl ether sulfonates, alkyl sulfonate, branched ether sulfonates, alkyl disulfonate, alkyl disulfate, alkyl sulfosuccinate, alkyl ether sulfate, branched ether sulfates, such as those described in GB 2,347,682 A. Examples of these surfactants have the general formula:

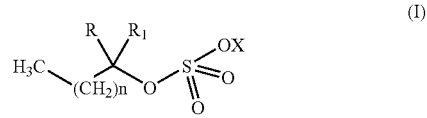

where R is hydrogen or methyl;

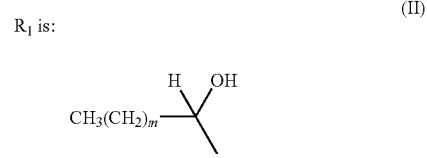

where m may take any value as long as m<n; or
where R and $R_1$ may both be moiety (II) where m may take any value as long as m<n; or
where R is hydrogen or methyl;
$R_1$ is:

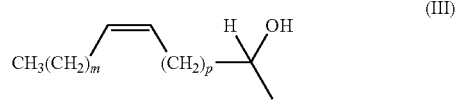

where m and p may take any value as long as (m+p)<n, or
where both R and $R_1$ may both be moiety (III), where m and p may take any value as long as (m+p)<n.

In there definitions, X is an alkali metal. In one non-limiting embodiment X is sodium or potassium.

In another non-restrictive embodiment of the invention, the microemulsion formulation contains a co-surfactant which is an alcohol having from about 3 to about 10 carbon atoms, in another non-limiting embodiment from about 4 to about 6 carbon atoms. A specific example of a suitable co-surfactant includes, but is not necessarily limited to, butanol.

In one non-limiting embodiment of the invention, the single phase microemulsion contains non-polar liquid, which may include a synthetic fluid including, but are not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, mineral oils such as Escaid 110 (from Exxon) or ECD 99-DW oils (from TOTAL) can also be used as a non-polar liquid in preparing the fluid systems of this invention.

It will be appreciated that the amount of single phase microemulsion-forming components (polar, nonpolar and a surfactant) to be used is difficult to determine and predict with much accuracy since it is dependent upon a number of inter-related factors including, but not necessarily limited to, the brine type, the bridging particle type, the temperature of the formation, the particular surfactant or surfactant blend used, whether a chelating agent is present and what type, etc. Nevertheless, in order to give some idea of the quantities used, in one non-limiting embodiment, the proportion of non-brine components in the single phase microemulsion may range from about 1 to about 50 volume %, from about 5 to about 20 volume %, and in another non-limiting embodiment may range from about 5 to about 20 volume %.

It is expected that brine will be a common component of the single phase microemulsion, and any of the commonly used brines, and salts to make them, are expected to be suitable in the compositions and methods of this invention.

In the non-limiting embodiment where the single phase microemulsion contains at least one chelating agent, the chelating agent should be capable of solubilizing or dissolving the bridging particles that make up the filter cake. The chelating agent may be an inorganic acid or salt thereof including, but not necessarily limited to, hydrochloric acid, sulfuric acid, and/or an organic acids including, but not necessarily limited to, an organic agent or salt thereof, e.g. acetic acid, formic acid and mixtures thereof. In one non-limiting embodiment, the acid may be only one mineral acid or only one organic acid.

In most embodiments, the microemulsion contains at some point a chelating agent that is a polyamino carboxylic acid (PACA) or a salt of PACA. Suitable PACAs include, but are not necessarily limited to, nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxy-ethylethylenediamine triacetic acid (HEDTA), triethylenetetraamine hexaacetic acid (TTHA), trans-1,2-diaminocyclohexane tetraacetic acid (DCTA), and mixtures thereof.

The concentration of chelating agent in the single phase microemulsion has a lower limit of about 1 volume %, alternatively of about 5 volume %, and an upper limit of about 30 volume %, alternatively about 20 volume %, and in another non-restrictive embodiment up to about 15 volume %.

There are various ways by which the chelating agent may be delivered according to the inventive procedure. The chelating agent may be added to the filter cake with the single phase microemulsion; or may be added after the single phase microemulsion treatment; or may be added to the microemulsion soak solution once it is in place before removing the majority of the filter cake particles and invert emulsion and combinations thereof.

Typical or expected bridging particles expected to be useful in the methods of this invention include, but are not necessarily limited to, calcium carbonate, hematite, ilmenite, magnesium tetroxide, manganous oxide, iron carbonate, magnesium oxide, barium sulfate, and mixtures thereof.

In the embodiment where a gravel pack is introduced, the single phase microemulsion is created in carrier brine containing sized gravel (sand) where the gravel is sized to bridge the formation to inhibit or prevent the production of sand. The gravel pack embodiment will be discussed in further detail below.

With further specificity, the invention concerns one-trip clean up spotting fluids designed to physically change an invert emulsion filter cake and acidify the acid soluble components on the cake. The inventive method not only physically changes the nature of the deposited filter cake, the resulting oil components of the original filter cake which are micro-emulsified, allow for ease of water injection, in the case of injection wells, or ease of production through completion screens, in the case of production wells. With the conversion of the external oil to internal microemulsified oil in water, plus the optional decomposition of minerals (e.g. bridging particles e.g. calcium carbonate and other acid-soluble components) by chelating agents, most of the filter cake is either removed or micro-sized to the extent that only a minimal or reduced amount of damaging components remain on a reservoir face.

The method of operation for an open hole completion deploying either expandable or non-expandable screens and changing the filter cake, including removing oil and decomposing the mineral fraction may be as follows, in one non-limiting embodiment:

1. Drill to total depth with an invert emulsion drilling fluid, which fluid includes acid-soluble weighting agents, where the weighting agents form a filter cake on the wellbore.
2. Make a short trip into the casing.
3. Run in the hole (RIH) to the bottom and make any composition changes deemed necessary to the drilling fluid.
4. Pump a base oil spacer to scour any external filter cake in the wellbore.
5. Pump a viscosified, weighted push pill that includes the invert emulsion drilling fluid to carry dislodged particles up the wellbore away from the production zone.
6. Pump a solids-free invert emulsion drilling fluid into the open hole and 100 to 200 feet into the casing.
7. Pick up to casing shoe, circulate the fluid remaining in the casing and screen the larger solids from the drilling fluid, leaving particles in the drilling fluid to a size that will not plug completion screens when running to bottom.
8. Pull out of the casing to the surface.
9. Pick up screen and run to bottom of hole.
10. Expand screen, if the screen is expandable.
11. Trip out of the hole with the work string or expandable tools.
12. Run in the hole with modified CSAP (packer, ball valve and wash pipe) and set packer.
13. Displace the solids-free invert-emulsion in the open hole and spot the single phase microemulsion treatment in the open hole and 100-200 ft (30-61 m) into the casing, where the oil-in-water emulsion soak solution is as described previously.
14. Displace above packer assembly to single phase microemulsion treatment.

15. Check leak-off.
16. Allow the single phase microemulsion to penetrate the filter cake.
17. Prepare to inject water or produce hydrocarbons.

The single phase microemulsion treatment may be composed of different brine and oil blends, depending on the required density of the fluid for the well. The optional acid or PACA chelating agent concentration may be varied as needed, including the type of acid or chelating agent. One important new feature of the invention is that the microemulsion optionally contains a chelating agent (acid or salt thereof) or PACA chelating agent that dissolves solids contained in the invert emulsion filter cake, and clean up a wellbore.

This technology does not require or discriminate against any invert emulsion. In other words, the single phase microemulsion can be applied to filter cake clean up for any invert emulsion drilling fluid system regardless of base oil type or emulsifier used to formulate the mud. This versatility allows an operator flexibility to formulate the drilling fluid based on wellbore needs. This is not the case in some prior methods where by highly specific amine emulsifiers are needed because they require acid protonation to reverse the wettability. In the inventive technology, the chelating agent is only used for removal of acid soluble bridging components. In one non-limiting embodiment the methods and compositions are practiced in the absence of amine emulsifiers, such as rosin amines and/or amine emulsifiers of the formula R—N—[(CH$_2$CH$_2$R'A)$_x$H]$_2$, such as those defined in U.S. Pat. Appln. Pub. No. 2004/0147404.

Another important feature of the invention relative to other invert emulsion filter cake removal methods is that the oil phase of the invert emulsion is micro-emulsified into the single phase microemulsion. The inventive treatment process reduces the energy necessary for the microemulsion to form when compared to previous methods. This efficiency reduces the number of pipe trips and decreases the time required to complete the well.

The invention will now be further discussed with respect to actual implementation of the invention in Examples which are not intended to limit the invention, but simply to further illustrate it.

A number of laboratory tests have been performed using the inventive single phase microemulsion chemistry and Baker Oil Tools' acid treatment packages on filter cakes deposited by an invert emulsion consisting of a 10 lb/gal (1.2 kg/liter) synthetic-based mud (SBM). Tables I, II, and III show permeability data after tests performed on 10 and 20 µm ceramic discs and Berea sandstone in a Disc-Sandpack Permeameter and a Hassler Permeameter. As the data below illustrates, the chemical techniques of removing filter cake damage and avoiding sludge damage has been demonstrated by performing a series of water injection tests. Water injection testing was chosen because this type of test mimics a "worse case" scenario and more easily exposes incomplete clean up results.

Phase I: Testing the Concept with a "Two-Step" Soak Procedure

The first phase of testing consisted of filter cake deposition on 10 and 20 µm ceramic discs followed by treatment with Exp-195, a concentrate used to form the single phase microemulsion, for a 90 minute period. Both Exp-195 and Exp-194 are each a concentrated blend of surfactants with water and non-polar solvents, as described in GB 2,347,682 A. The initial cake deposition time for these screening tests was 1-hr. The purpose of a 1-hr mud-off, at 150° F. (66° C.) and 500 psi (3.4 MPa), was to have a filter cake that had a reasonable thickness to "break" in order to verify the efficacy of the single phase microemulsion technology. Typical mud cake appearance after mud-off at 150° F. (66° C.) and 500 psi (3.4 MPa) is shown in FIG. 1. Each single phase microemulsion contained 10% volume Exp-195 in CaCl$_2$ and was allowed to soak at 150° F. (66° C.) and 200 psi (1.4 MPa) for up to 2.0 hours. The invert emulsion mud was purposely formulated with 128 lb/bbl (366 g/liter) of calcium carbonate in anticipation of follow-up acid soak treatments. There was no acid-insoluble weight material added to the mud formulation. The one-step soak treatments (single phase microemulsion+acid) were not tested until satisfactory results were achieved with the single phase microemulsion portion of the test matrix.

Figure 2:
FIG. 2 is a photograph of a typical mud cake appearance on a ceramic disc such as that of FIG. 1 after a chemical soak containing no acid.

Based on the results, the 10% Exp-195 formed a 10 lb/gal (1.2 kg/liter) CaCl$_2$ single phase microemulsion which seemed to completely remove the invert emulsion contained in a 1-hr filter cake deposit. In each case, the remaining cake matter (residue) was altered to the point that it could be easily removed from the test cell after soaking. A photograph of typical results after the chemical soak with no acid is shown in FIG. 2.

Figure 3:
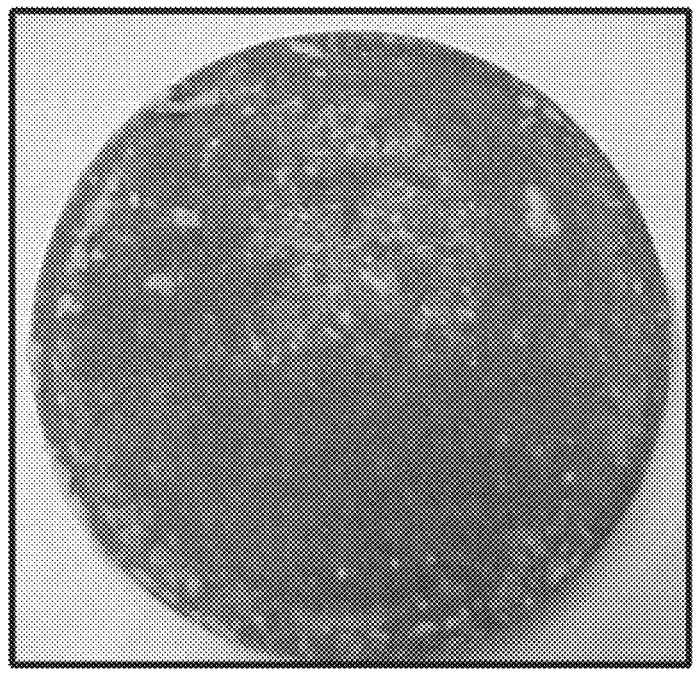
FIG. 3 is a photograph of a typical mud cake appearance on a ceramic disc after an acid soak.

The two-step soak test results document that when the single phase microemulsion formed with Exp-195 concentrate was followed with an acid soak (10% Acetic Acid Package in NH$_4$Cl or in 10 lb/gal (1.2 kg/liter) CaCl$_2$ brine), the return injection permeability results were very high. A typical cake appearance after an acid soak is shown in FIG. 3. Higher than 100% calculated values have been attributed to the additive package included with the acid. The acid "package" (from Baker Oil Tools) includes a surface tension reducer, mutual solvent, corrosion inhibitor and an iron controller.

Table I gives the results of the two-step soak procedure.

TABLE I

Two-Step Soak Test Results
Exp-195 Concentrate-Based Single Phase Microemulsion Soaks
followed by Acid Package Soak
Disc-Sandpack Permeameter/Water Injection Permeability

| Soak 1 | Soak 2 | Init. Perm | Final Perm | % Inj. Perm |
|---|---|---|---|---|
| Test #1 (1-hr mud-off on 10 µm ceramic disc) | | | | |
| 10% Exp-195 in 10 ppg (1.2 kg/liter) CaCl$_2$ | 10% acetic acid in 10 ppg (1.2 kg/liter) CaCl$_2$ | 171 mD | 168.6 mD | 94.5 |
| Test #2 (1-hr mud-off on 20 µm ceramic disc) | | | | |
| 10% Exp-195 in 10 ppg (1.2 kg/liter) CaCl$_2$ | 10% acetic acid in 10 ppg (1.2 kg/liter) CaCl$_2$ | 239.8 mD | 237.7 mD | 99.1 |
| Test #3 (1-hr mud-off on 20 µm ceramic disc) | | | | |
| 10% Exp-195 in 10 ppg (1.2 kg/liter) CaCl$_2$ | 10% acetic acid in 10 ppg (1.2 kg/liter) 5% NH$_4$Cl | 143.6 mD | 210.0 mD | 146.2 |
| Test #4 (1-hr mud-off on 20 µm ceramic disc - repeatability test 1) | | | | |
| 10% Exp-195 in 10 ppg (1.2 kg/liter) CaCl$_2$ | 10% acetic acid in 10 ppg (1.2 kg/liter) 5% NH$_4$Cl | 137.9 mD | 245.3 mD | 168.6 |
| Test #5 (1-hr mud-off on 20 µm ceramic disc - repeatability test 2) | | | | |
| 10% Exp-195 in 10 ppg (1.2 kg/liter) CaCl$_2$ | 10% acetic acid in 10 ppg (1.2 kg/liter) 5% NH$_4$Cl | 131.4 mD | 153.2 mD | 116.6 |

TABLE I-continued

Two-Step Soak Test Results
Exp-195 Concentrate-Based Single Phase Microemulsion Soaks
followed by Acid Package Soak
Disc-Sandpack Permeameter/Water Injection Permeability

| Soak 1 | Soak 2 | Init. Perm | Final Perm | % Inj. Perm |
|---|---|---|---|---|
| Test #6a (8-hr mud-off on 20 μm ceramic disc) | | | | |
| 10% Exp-195 in 10 ppg (1.2 kg/liter) CaCl$_2$ | 10% acetic acid in 10 ppg (1.2 kg/liter) 5% NH$_4$Cl | 560.0 mD | 161.2 mD | 10.9 |
| Test #6b (8-hr mud-off on 20 μm ceramic disc) | | | | |
| Re-Used #6a Disc | 10% acetic acid in 10 ppg (1.2 kg/liter) 5% NH$_4$Cl | 560.0 mD | 471.1 mD | 84.1 |

The results of Test #6a and #6b suggest that for longer term mud-off, longer soak times are required.

Phase 1: Conclusions

Phase I results suggest (94 to >100% water injection permeability) that the single phase microemulsion alters the filter cake (FIG. 2) so that when an acid treatment is added, the calcium carbonate particles can be dissociated by the acid without creating an unwanted sludge between the original invert emulsion filter cake and the CaCl$_2$ brine single phase microemulsion.

From Test 3 on, the Soak 2 solutions are composed of an "acid package" containing the additives listed above. The very high percentages of injection permeability are probably attributed to the contribution of a surface tension reduction additive in the acid package. Without this additive, the percent return injection permeability was 94 to 99%.

The results in Test 6a indicates that the filter cake resulting from long term static cake deposition should be remedied by rig procedures and/or longer soak times. However, Test 6b indicates that after an 8-hr deposition, acid removal is very effective even with an extended acid soak time.

In summary, a two-step treatment consisting of a single phase microemulsion followed by an acid package (such as that previously identified in one non-limiting embodiment) will prepare a reservoir for water injection.

Phase 2: Testing the "One-Step" Soak Concept

The second phase of the testing consisted of soaking the invert emulsion filter cakes with blends of Exp-195 and an acetic acid package in 10 lb/gal (1.2 kg/liter) CaCl$_2$ brine to form a single phase microemulsion. After the 1-hr mud-off on the Disc-Sandpack Permeameter, the acid containing single phase microemulsion treatment gave a water injection return permeability result greater than 100% (Test #7).

Due to the success of the first "One-Step" soak test on the Disc-Sand-pack Permeameter, testing was moved to a Hassler Permeability Permeameter using Berea Sandstone. Due to the 16-hr mud off time, the filter cake was flushed with base oil at 200 psi (1.4 MPa) to simulate a wellbore displacement to remove the external filter cake. The Exp-195 concentration was increased to 15% and blended with the 10% acetic acid in 10 lb/gal (1.2 kg/liter) CaCl$_2$ single phase microemulsion. The first test (Tests #8) was only an injection test. The final test, Test 9, was divided up into two phases. Phase I (Test #9a) was an injection test performed with the exact procedures used in Test #8. Phase II (Test #9b) incorporated a water injection but in the production direction followed by a second injection in the original direction. The results given below in Table II demonstrate that there is value in producing the filter cake and then re-injecting, however, the original injection results without production flow gave very good results.

TABLE II

One-Step Soak/Injection Permeability Test Results
Exp-195/Acid Package Single Phase Microemulsion Soak
Disc-Sandpack Permeameter
Test #7 - One-Hour Mud Off on 20 μm Ceramic Disc

| One-Step Soak | Init. Perm | Final Perm | % Inj. Perm |
|---|---|---|---|
| 10% Exp-195 and 10% acetic acid in 10% CaCl$_2$ | 127.5 mD | 380.6 mD | 298.5 |

Hassler Permeameter - 16-hr Mud Off

| Pre-Flush | One-Step Soak | Init. Perm | Final Perm | % Inj. Perm |
|---|---|---|---|---|
| Test #8 - 2364 mD Berea Core | | | | |
| Base Oil @ 200 psi (1.4 MPa) | 15% Exp-195 and 10% acetic acid in 10% CaCl$_2$ 2 hr soak | 2364 mD | 2017 mD | 85.3% |
| Test #9a - 1323 mD Berea Core | | | | |
| Base Oil @ 200 psi (1.4 MPa) | 15% Exp-195 and 10% acetic acid in 10% CaCl$_2$ 2 hr soak | 1323 mD | 1150.9 mD | 86.9% |
| Test #9b - 1323 mD Berea Core | | | | |
| Base Oil @ 200 psi (1.4 MPa) | 10% Exp-195 and 10% acetic acid in 10% CaCl$_2$ 2 hr soak | 1323 mD | 1326 mD | 100.3% |

This test (Test 9b) included a water flow in the production direction after the first injection test (Test 9a) and before re-injecting water in the injection direction. No additional soaking was done.

Phase 2: Conclusions

Phase 2 demonstrated two important concepts for this invention. The first is that a "one-step" single phase microemulsion soak solution composed of the completion brine, 10-15% of the EXP 195 and 10% acetic acid is compatible and works simultaneously to prepare a sand face for injection or production (Tests #7 and #8). The second concept demonstrated is that a pre-flush is very helpful to remove some of the compacted filter cake left by a 16-hr mud-off (Tests #8, #9a and #9b). Field procedures to avoid the development of a compacted, static filter cake will be discussed in a later section.

Phase 3: The Effects of Calcium Carbonate Loading and Mud-Off Time Changes

It has been demonstrated in previous laboratory testing that the time of mud-off has a significant (negative) effect on permeability, especially if a static filter cake is allowed to form over long periods of time. If a static filter cake is allowed to build in field applications, high rate displacements are pumped to reduce the static filter cake thickness. In some cases, such as some stand-alone and expandable sand screen applications, it may not be possible to exercise high rate displacements. Thus, rig procedures are put in place to avoid long term (greater than 2-hr) static deposition of mud cakes.

A series of static tests were performed on a Disc-Sandpack Permeameter. The cake deposition time for each test prior to the second water injection permeability measurement was 1, 2 and 3 hours with different carbonate loads. Those results are given below.

TABLE III

Test #11 - Time/Carbonate Loading
Effects on Cake Clean Up Injection Permeability Results

| Mud-off Time, hrs | CaCO$_3$ Loading, lb/bbl (g/l) | Initial Injection Permeability, mD | Final Injection Permeability, mD | % Injection Permeability |
|---|---|---|---|---|
| 3 | 128 (366) | 95.3 | 45.9 | 48.2 |
| 3 | 50 (143) | 179.8 | 121.0 | 67.3 |
| 2 | 128 (366) | 230.5 | 194.3 | 84.3 |
| Soak times for the above tests were held constant at 2 hrs. | | | | |
| 3 | 50 (143) | 239.7 | 216.4 | 90.3 |

Soak time for the last test was performed overnight under shut-in conditions.
The single phase microemulsion was 15% Exp-195/10% Acetic Acid in brine.
None of these tests were flowed in the production direction to clean pores.

Phase 3 Conclusions: Soak Time/Carbonate Loading

Figure 4:
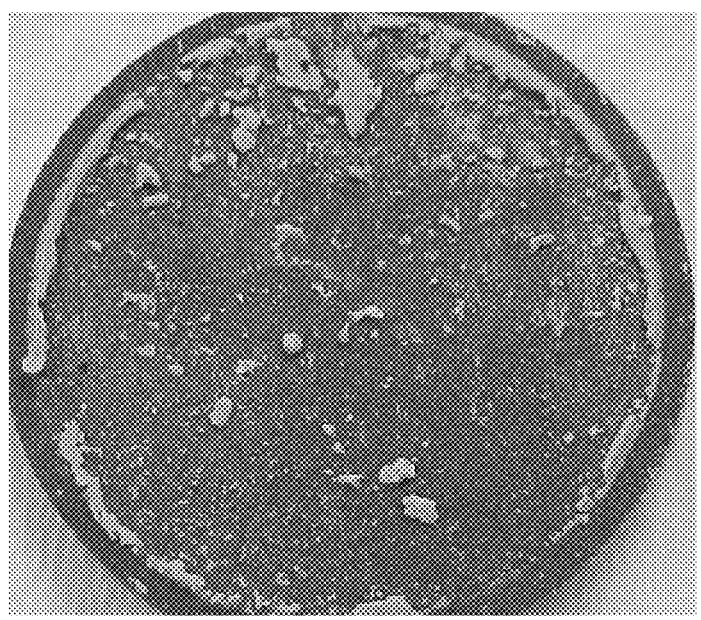
FIG. 4 is a photograph of mud cake results for a 16-hour "one-step" soak after a 3-hour mud-off.

FIG. 4 presents the 16-hour "one-step" soak results after 3-hour mud-off and demonstrates that a long term, "one-step" soak on a static filter cake will clean up very efficiently if time is allowed. This is the fourth and last test of the soaks shown in the Table III above. Note that the clean up did not produce pin holes, rather there was almost complete coverage.

There is an advantage in having an emulsion change process take place over an extended period of time, namely, longer filter cake break up times allow for pulling out of the hole after deploying the screens or preparing to produce the well after gravel packing. During these preparation times, the external cake damage can be removed for either injection or production.

Other Considerations

Screen Applications

The "one-step" technology of this invention can be applied to filter cake clean up for stand-alone and expandable screen applications where an operator desires improved production or water injection. The advantage to this inventive method is that completion brine can be placed across the reservoir after the screens are in place and without the concern of producing unwanted sludge. The fact that invert emulsion filter cake alteration and acidizing takes place simultaneously adds to a user's flexibility while saving time and money.

One non-limiting generalized procedure for using the "One-Step" cake clean up technology is as follows.

Drill to total depth (TD)
Short Trip
Run in hole (RIH) to bottom and condition the mud rheologically
Pump push pill and solids-free invert emulsion in open hole (OH) and 300 ft (91 m) of casing
Pick up (P/U) to 100 ft (30 m) above the shoe, circulate and size to solids across appropriate shale shakers
Pull out of the hole (POOH)
P/U EXPress or other screen assembly, fill with mud containing sized solids
RIH
Expand Screen if EXPress (expandable screen)
Trip out of hole (TOH) w/tools
RIH w/modified CSAP (packer, ball valve, wash pipe), set packer
Spot the "One-Step" soak solution
Displace above the packer to brine
Check leak-off
Repeat spot/soak, as necessary
POOH Gravel Pack Embodiment The single phase microemulsion technology of this invention also has an application in gravel pack operations after a reservoir is drilled with an invert emulsion. Most of the procedures would be the same as outlined above with expandable and stand-alone screens. Solids-free and solids-conditioned invert emulsions are left in the open hole and casing respectively until screens are placed on bottom and the packer is set. After the packer is set the casing above the packer is displaced to brine and the casing is cleaned. When rigged up to pump casing, a series of push and cleaning pills are used to replace the open hole to brine and scour the filter cake. The gravel pack carrier brine can be formulated as a single phase microemulsion and allowed to change the invert emulsion of the filter cake after the gravel is in place. The concentration can be adjusted to speed up or slow down the reversal. If acidizing is desired, acid may be placed inside the screens and allowed to diffuse toward the formation to decompose acid soluble components.

One advantage of this procedure is that massive shale or other troublesome shale sections are protected with an invert emulsion fluid until just before the gravel is pumped. A second advantage is that the carrier fluid is a single phase microemulsion for total contact with the filter cake. A third benefit is that the solids-free and conditioned muds temporarily left in the hole while the screens are run to bottom can be recycled into the invert emulsion drilling fluid. Finally, using the "One-Step" removing invert emulsion/acidizing technology or using the single phase microemulsion separately allows the operator to base his invert emulsion formulation on reservoir needs because the single phase microemulsion technology is applicable to all invert emulsion drilling fluid filter cakes. There is no need to "flip" any portion of the drilling fluid at any time during the completion operation.

Typically, PACA additives dissolve calcium carbonate and barium sulfate minerals slowly. Laboratory studies indicate that 24 to 48 hours are required to dissolve at least 50% of a given quantity of barium sulfate as shown in Table IV. Also, this table shows that at least 24 hours are required to dissolve 100% of calcium carbonate. The PACA additives used to prepare the data in Tables IV and V were EDTA and DTPA.

Table V shows injection permeability results after soaking a 10.0 lb/gal (1.2 kg/liter) oil-base filter cake with a 1-step soak solution containing PACA. The test below achieved 26.7% return injection permeability after only a 3-hour contact of the soak solution with the calcium carbonate filter cake. This percentage of injection permeability is acceptable considering only a 3-hour exposure time. Higher injection permeability can be achieved by extending the soak time which will dissolve a greater amount of calcium carbonate.

TABLE IV

Solubilization of Barium Sulfate and Calcium Carbonate Using PACA

| Time hours | Barium Sulfate Solubilization, % | Calcium Carbonate Solubilization, % |
|---|---|---|
| 0 | 0 | 0 |
| 24 | 50 | 100 |
| 48 | 69 | 100 |

TABLE V

One-Step Soak/Injection Permeability Test Results
Exp-195/PACA Single Phase Microemulsion Soak
Disc-Sandpack Permeameter
Test #12 - One-Hour Mud Off on 20 µm Ceramic Disc
10.0 lb/gal Oil-base Mud with Calcium Carbonate

| One-Step Soak | Init. Perm | Final Perm | % Inj. Perm |
|---|---|---|---|
| 15% Exp-195 and 25 lb/bbl PACA in KCl brine.* | 369.1 mD | 106.1 mD | 28.7 |

*Soak time 3 hours. This test which included the PACA resulted in a 100% improvement in injection permeability over the base-line test.

In summary, a number of conclusions may be reached.
1. The single phase microemulsion comprised of 10%-15% Exp-195 in brine forms a single phase microemulsion that appears to completely destroy the invert emulsion portion of a filter cake. The filter cake loses all integrity and appears to become essentially entirely dislodged from the ceramic filter medium.
2. Other single phase microemulsion chemistry options are available. Exp-195 results in a $CaCl_2$ brine single phase microemulsion, while other surfactant options support the use of seawater, NaCl, or other brine types.
3. If the invert emulsion drilling fluid is barite free or contains only acid soluble bridging components, the filter cake can be destroyed chemically by the single phase microemulsion chemistry and acid to allow for excellent injection rates.
4. The single phase microemulsion chemistry may be blended in brine containing an acid package to clean up the filter cake in a 1-step clean up process.
5. Static filter cakes deposited for long periods of time will require (1) either a high rate displacement to remove the enlarged, compacted external filter cake volume or (2) a longer soak time and a modified single phase microemulsion.
6. The alteration of the invert emulsion filter cake using the single phase microemulsion technology is applicable after screen deployment or after gravel packing.
7. An operator can drill with an invert emulsion fluid and then safely and efficiently displace to brine in preparation for either a stand-alone screen, an expandable screen or low viscosity α-β open hole gravel pack applications when using a single phase microemulsion.
8. The displacement to brine can occur either before or after the screens have been run, provided the invert emulsion fluid has been conditioned for solids size.
9. In one non-limiting embodiment, the decision to displace an invert emulsion fluid and to remove the filter cake may be reservoir-based and should be determined by such factors including, but not limited to, the nature of drilled solids, formation fluid compatibilities and operation considerations.

In the foregoing specification, the invention has been described with reference to specific embodiments thereof, and has been suggested as effective in providing effective methods and compositions for removing filter cake particles from a hydrocarbon wellbore. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of single phase microemulsion forming components, chelating agents, acids, solvents, non-polar liquids, etc. and proportions thereof falling within the claimed parameters, but not specifically identified or tried in a particular composition to improve the removal of filter cake particles herein, are anticipated to be within the scope of this invention. Additionally, the methods and compositions of this invention may find utility in other applications besides screen applications, gravel pack applications and the like.

We claim:
1. A thermodynamically stable, macroscopically homogeneous, single phase microemulsion comprising:
    a polar phase;
    a nonpolar phase;
    a surfactant;
    a polyamino carboxylic acid and salts thereof in a concentration in the microemulsion ranging from 1 to 30 volume %; and
    an acid selected from the group of inorganic acids consisting of hydrochloric acid, sulfuric acid, and mixtures thereof, and organic acids consisting of acetic acid, formic acid and salts thereof and mixtures thereof.
2. The microemulsion of claim 1 where the surfactant is selected from the group consisting of non-ionic surfactants, anionic surfactant, cationic surfactants and amphoteric surfactants.
3. The microemulsion of claim 2 where the nonionic surfactant is selected from the group consisting of alkyl polyglycosides, sorbitan esters, methyl glucoside esters, and alcohol ethoxylates; the anionic surfactant is selected from the group consisting of alkali metal alkyl sulfates, alkyl sulfonates, branched ether sulfonates, alkyl disulfonate alkyl disulfates, alkyl sulphosuccinates, alkyl ether sulfates, and branched ether sulfates; and the cationic surfactant are selected from the group consisting of arginine methyl esters, alkanolamines, and alkylenediamides.
4. The microemulsion of claim 1 where the polyamino carboxylic acid is selected from the group consisting of nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetraamine hexaacetic acid (TTHA), trans-1,2-diaminocyclohexane tetraacetic acid (DCTA), and salts thereof and mixtures thereof.
5. The microemulsion of claim 1 where the microemulsion further comprises brine.
6. A thermodynamically stable, macroscopically homogeneous, single phase microemulsion comprising:
    a polar phase comprising brine;
    a nonpolar phase;
    a surfactant selected from the group consisting of nonionic surfactants, anionic surfactant, cationic surfactants and amphoteric surfactants;
    a polyamino carboxylic acid and salts thereof; and
    an acid selected from the group of inorganic acids consisting of hydrochloric acid, sulfuric acid, and mixtures thereof, and organic acids consisting of acetic acid, formic acid and salts thereof and mixtures thereof.
7. The microemulsion of claim 6 where the nonionic surfactant is selected from the group consisting of alkyl polyglycosides, sorbitan esters, methyl glucoside esters, and alcohol ethoxylates; the anionic surfactant is selected from the group consisting of alkali metal alkyl sulfates, alkyl sulfonates, branched ether sulfonates, alkyl disulfonate alkyl disulfates, alkyl sulphosuccinates, alkyl ether sulfates, and branched ether sulfates; and the cationic surfactant are selected from the group consisting of arginine methyl esters, alkanolamines, and alkylenediamides.

8. The microemulsion of claim 6 where the polyamino carboxylic acid is selected from the group consisting of nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetraamine hexaacetic acid (TTHA), trans-1,2-diaminocyclohexane tetraacetic acid (DCTA), and salts thereof and mixtures thereof.

9. The microemulsion of claim 6 where the concentration of polyamino carboxylic acid in the microemulsion ranges from 1 to 30 volume %.

10. A thermodynamically stable, macroscopically homogeneous, single phase microemulsion comprising:
   a polar phase;
   a nonpolar phase;
   a surfactant selected from the group consisting of nonionic surfactants, anionic surfactant, cationic surfactants and amphoteric surfactants;
   a polyamino carboxylic acid and salts thereof; and
   an acid selected from the group of inorganic acids consisting of hydrochloric acid, sulfuric acid, and mixtures thereof, and organic acids consisting of acetic acid, formic acid and salts thereof and mixtures thereof.

11. The microemulsion of claim 10 where the nonionic surfactant is selected from the group consisting of alkyl polyglycosides, sorbitan esters, methyl glucoside esters, and alcohol ethoxylates; the anionic surfactant is selected from the group consisting of alkali metal alkyl sulfates, alkyl sulfonates, branched ether sulfonates, alkyl disulfonate alkyl disulfates, alkyl sulphosuccinates, alkyl ether sulfates, and branched ether sulfates; and the cationic surfactant are selected from the group consisting of arginine methyl esters, alkanolamines, and alkylenediamides.

12. The microemulsion of claim 10 where the polyamino carboxylic acid is selected from the group consisting of nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetraamine hexaacetic acid (TTHA), trans-1,2-diaminocyclohexane tetraacetic acid (DCTA), and salts thereof and mixtures thereof.

13. The microemulsion of claim 10 where the concentration of polyamino carboxylic acid in the microemulsion ranges from 1 to 30 volume %.

* * * * *